UNITED STATES PATENT OFFICE

2,221,147

PREPARATION OF AMINATED ESTERS OF SULPHYDRYL COMPOUNDS

Roger A. Mathes, Akron, Ohio, assignor to The B. F. Goodrich Company, New York, N. Y., a corporation of New York No Drawing. Application November 18, 1938, Serial No. 241,199

18 Claims. (Cl. 260—306)

This invention relates to the preparation of derivatives of sulphydryl compounds and more specifically to aminated esters of such compounds. These esters are valuable as accelerators for the vulcanization of rubber.

The object of this invention is to provide methods for preparing aminated esters of sulphydryl compounds. A further object is to provide new compositions of matter.

These objects are accomplished, in accordance with my invention, by causing a sulphydryl compound to react with a halogen alkyl amine or an amino alkyl sulfuric acid.

The following equation in which 2-mercaptothiazoline is reacted with 2-aminoethyl sulfuric acid is illustrative of the process.

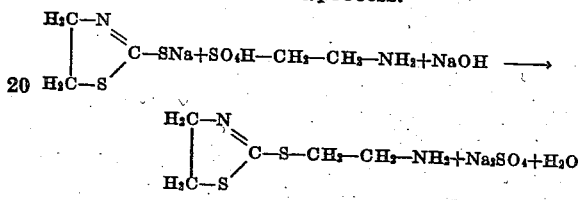

This new class of compounds comprises the reaction products of a halogen alkyl amine or an amino alkyl sulfuric acid and members of a class of organic compounds possessing the grouping:

where R is nitrogen or sulfur; Y is sulfur or nitrogen; R' is an acidic hydrogen atom of a mercapto group or a salt forming group as sodium, potassium, etc. When R is nitrogen, Y preferably is sulfur. R and Y may or may not be members of a ring.

Examples of the above class of compounds, where R is nitrogen and Y is sulfur are the dithiocarbamic acids such as dimethyl dithiocarbamic acid, diethyldithiocarbamic acid, dibutyldithiocarbamic acid, dibenzyldithiocarbamic acid, diphenyldithiocarbamic acid, phenyl-naphthyl-dithiocarbamic acid, etc.

Where R is sulfur and Y is nitrogen, each of which is part of a ring, examples include mercaptoalkylthiazoles, mercaptoarylene thiazoles, mercaptothiazolines, mercaptopenthiazolines, mercaptothiodiazoles, etc. Specific compounds are 2-mercaptothiazole, 2-mercapto 4-ethyl thiazole, 2-mercapto 4,5-dimethylthiazole, 2-mercapto 4-methylthiazole, 2-mercapto 4-phenylthiazole, 2-mercaptobenzothiazole, 2-mercaptotetrahydrobenzothiazole, 2-mercapto 6-nitro benzothiazole, 2-mercapto 4-methyl-benzothiazole, 2-mercapto 6-chlorobenzothiazole, 2-mercaptonaphthothiazole, 2-mercaptothiazoline, 2-mercapto 5-methylthiazoline, 2-mercapto 4,5-dimethylthiazoline, 2-mercapto 4-dimethylthiazoline, 2-mercapto 4-phenyl thiazoline, 2-mercapto 4,5-cyclotetramethylene thiazoline, 2-mercaptopenthiazoline, 2-mercapto 6-methyl penthiazoline, 3-phenyl 5-mercapto 1,2,3-thiodiazole, 2-methyl 2-hydro 3-phenyl 5-mercapto 1,3,4-thiodiazole.

While the classes of compounds enumerated are preferred, I do not wish to limit myself to these specific types. Many other organic sulphydryl compounds may likewise be employed. Examples of these other classes are mercapto oxazoles, mercapto oxazolines, mercapto imidazoles, xanthates, dithio acids, mercaptoquinolines, etc.

The ester forming amino alkyl compounds satisfactory for use in this process possess the following formula

where X is halogen or an HSO₄ group, and A is an alkylene group with the free bonds on different carbon atoms. The alkylene groups, designated by A, may form a straight chain or may comprise a branched chain, such branched chain constituents consisting of alkyl, aryl groups, etc. In addition, such side chain alkyl groups may be joined together to form an alicyclic ring, as in 2-amino cyclohexyl sulfuric acid. Specific examples of these reactive primary amino compounds are 2-chloroethylamine, 2-bromoethylamine, 2-amino 1-chloro 2-methylpropane, 2-aminoethylsulfuric acid, 2-amino 1-methyl ethyl sulfuric acid 2-aminobutylsulfuric acid, 2-amino 1-methyl propyl sulfuric acid, 2-amino 1-phenyl-ethyl sulfuric acid, 3-aminopropylsulfuric acid, 3-amino 1,3-dimethylbutyl sulfuric acid.

Compounds of the class described in this application may be readily prepared by reacting an aqueous solution of a water soluble salt of a sulphydryl compound with an alkyl amino compound containing a reactive group as previously described. The application of heat with agitation is usually desirable to carry out the reaction. The inorganic salt formed as a by-product will dissolve in the water used for the purpose of dilution. The reaction product which in most instances is an oil or soft resin may be readily separated from the water and dried in any suitable manner. When amino alkyl sulfuric acids are employed an equivalent molecular weight of an alkali is necessary to carry out the process. The halogen alkyl amines may be used as the free base or as the halogen acid salt, in the latter instance sufficient alkali being necessary to neutralize the free halogen acid.

Although the use of an aqueous medium is advantageous for carrying out the reaction, alcohol may also be employed. The reaction product is often soluble in alcohol, necessitating the removal of solvent by distillation. The reaction will also take place in the absence of a diluent.

The following examples describe the process more specifically, but it will be understood that the invention is not limited to these details. Variation both in the process and amounts of reactants are possible without materially affecting the results.

*Example 1.*—35.7 g. of 2-mercaptothiazoline are dissolved in an alcoholic sodium hydroxide solution made up by dissolving 12.6 g. of sodium hydroxide in 200 c. c. of alcohol. 24 g. of 2-chloroethyl amine are added and the solution is refluxed with agitation for about one hour. The sodium chloride formed as a by-product is filtered off and the product is recovered from the alcohol solution by evaporation. 46.5 g. of (2-aminoethyl) thiazoline sulfide are obtained, representing a 95.7% yield. The product is a thick, yellow oil.

*Example 2.*—The process essentially as described in Example 1 is repeated using 22.4 g. 2-mercaptothiazoline, 15.4 g. of sodium hydroxide dissolved in 70 c. c. water and 25.4 g. of 2-amino ethyl sulfuric acid. After refluxing for about two and one half hours, the product in the form of a thick yellow oil, is separated from the water. 25.4 g. of (2-aminoethyl) thiazoline sulfide are obtained representing an 87.3% yield.

*Example 3.*—25 g. of 2-mercaptobenzothiazole are dissolved in an aqueous sodium hydroxide solution containing 13.2 g. of sodium hydroxide and 125 c. c. of water. 21.2 g. of 2-aminoethyl sulfuric acid are added, and the solution is refluxed with agitation for about three and one half hours. The product, (2-aminoethyl) benzothiazylsulfide, is present as a heavy oil and is separated from the water. 28.6 g. are obtained representing a 90.8% yield. When cool, the product is a soft resin.

*Example 4.*—16.7 g. of the sodium salt of 2-mercapto 4,5-dimethyl thiazole and 9 g. of 2-chloroethylamine are dissolved in 125 c. c. of methanol. The solution is agitated under reflux for about one hour, then filtered to remove sodium chloride. The filtrate, containing the product in solution, is evaporated to isolate (2-aminoethyl) 4,5-dimethyl thiazylsulfide. 17.6 g. are obtained representing a 93.6% yield. The product is a thick, brown oil.

*Example 5.*—29 g. of 2-mercapto 4,5-dimethylthiazole and 28.2 g. of 2-aminoethylsulfuric acid are dissolved in 16.8 g. of sodium hydroxide dissolved in 150 c. c. of water. The solution is refluxed with agitation for about five hours, and the product as an oil is separated from the water. 34.4 g. are obtained, representing a 91.5% yield.

*Example 6.*—56 g. of sodium diphenyldithiocarbamate and 28.2 g. of 2-aminoethyl sulfuric acid are added to 88 g. of sodium hydroxide dissolved in 300 c. c. of water. When refluxed with agitation, a solution is obtained. Heating is continued for about three hours. (2-aminoethyl) diphenyl dithiocarbamate is obtained as a thick, yellow oil and is separated from the water layer. 47.5 g. are obtained, representing an 82.5% yield.

From the data herein presented, the fact will be readily apparent that this invention provides economical methods for preparing primary amino alkyl esters of sulphydryl compounds.

The reaction may be carried out in aqueous medium, inorganic by-product salts being discarded along with the diluent. High yields of pure, readily recoverable products are possible. The use of amino alkyl sulfuric acids is especially advantageous due to their ease of preparation at a low cost from hydroxyalkylamines and sulfuric acid. An efficient method is also furnished for carrying out the reaction in alcohol. The compositions produced are new chemical compounds which have not been known heretofore.

I claim:

1. A primary amino alkyl ester of a sulphydryl compound embodying the following formula

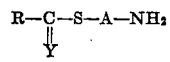

where Y is a member of the class consisting of sulfur and nitrogen; where R is nitrogen when Y is sulfur; R is sulfur when Y is nitrogen, in which case R and Y are members of a ring; and A is an alkylene hydrocarbon group with the free bonds on different carbon atoms.

2. A method for preparing compounds complying with the claim 1 formula which comprises reacting an alkyl primary amine in which the alkyl group is substituted by a single group of the class consisting of halogens and $HSO_4$ on a carbon atom other than that attached to the amino group, and a sulphydryl compound embodying the folowing formula

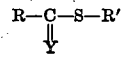

where R is nitrogen when Y is sulfur; R is sulfur when Y is nitrogen, in which case R and Y are members of a ring; R' is of the class consisting of hydrogen atoms and salt forming groups.

3. A method for preparing compounds complying with the claim 1 formula which comprises reacting an amino alkyl sulfuric acid in which the amino group and the sulfate group are on different carbon atoms and a sulphydryl compound embodying the formula

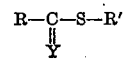

where R is nitrogen when Y is sulfur; R is sulfur when Y is nitrogen, in which case R and Y are members of a ring; R' is of the class consisting of hydrogen atoms and salt forming groups.

4. As a new composition of matter, a primary amino alkyl ester of a mercaptothiazole, in which the amino group and the ester forming group are on different carbon atoms.

5. As a new composition of matter, a primary amino alkyl ester of a mercaptothiazoline, in which the amino group and the ester forming group are on different carbon atoms.

6. As a new composition of matter, a primary amino alkyl ester of a dithiocarbamic acid, in which the amino group and the ester forming group are on different carbon atoms.

7. A method for preparing a primary amino alkyl ester of a mercaptothiazole which comprises reacting a material of the class consisting of mercaptothiazoles and salts thereof, with a compound embodying the following formula

X—A—NH₂ where X is of the class consisting of halogens and HSO₄; and A is an alkylene hydrocarbon group with the free bonds on different carbon atoms.

8. A method for preparing a primary aminoalkyl ester of a mercaptothiazoline which comprises reacting a material of the class consisting of mercaptothiazolines and salts thereof, with a compound embodying the following formula

X—A—NH₂ where X is of the class consisting of halogens and HSO₄; and A is an alkylene hydrocarbon group with the free bonds on different carbon atoms.

9. A method for preparing a primary aminoalkyl ester of a dithiocarbamic acid which comprises reacting a material of the class consisting of dithiocarbamic acids and salts thereof, with a compound embodying the following formula

X—A—NH₂ where X is of the class consisting of halogens and HSO₄; and A is an alkylene hydrocarbon group with the free bonds on different carbon atoms.

10. 2-aminoethyl benzothiazylsulfide.

11. 2-aminoethyl thiazoline sulfide.

12. 2-aminoethyl diphenyldithiocarbamate.

13. A method for preparing a primary aminoalkyl ester of a mercaptothiazole which comprises reacting an aqueous solution of an alkali salt of a mercaptothiazole with a compound embodying the following formula

X—A—NH₂ where X is halogen or a HSO₄ group; and A is an alkylene hydrocarbon group with the free bonds on different carbon atoms.

14. A method for preparing a primary aminoalkyl ester of a mercaptothiazoline, which comprises reacting an aqueous solution of an alkali salt of a mercaptothiazoline with a compound embodying the following formula

X—A—NH₂ where X is halogen or a HSO₄ group; and A is an alkylene group with the free bonds on different carbon atoms.

15. A method for preparing a primary aminoalkyl ester of a dithiocarbamic acid, which comprises reacting an aqueous solution of an alkali salt of a dithiocarbamic acid with a compound embodying the following formula

X—A—NH₂ where X is halogen or a HSO₄ group; and A is an alkylene group with the free bonds on different carbon atoms.

16. A method for preparing (2-aminoethyl) benzothiazyl sulfide which comprises reacting a solution of 2-mercaptobenzothiazole and 2-amino ethyl sulfuric acid, in the presence of an amount of alkali sufficient to cause the reaction to take place.

17. A method for preparing (2-aminoethyl) thiazoline sulfide which comprises reacting a solution of 2-mercaptothiazoline and 2-amino ethyl sulfuric acid, in the presence of an amount of alkali sufficient to cause the reaction to take place.

18. A method for preparing (2-aminoethyl) diphenyl-dithiocarbamate which comprises reacting a solution of diphenyldithiocarbamic acid and 2-aminoethyl sulfuric acid, in the presence of an amount of alkali sufficient to cause the reaction to take place.

ROGER A. MATHES.